July 16, 1940.   F. O. HOAGLAND   2,207,804
DRILL GRINDER
Filed Oct. 28, 1938   2 Sheets-Sheet 1

INVENTOR.
F. O. Hoagland
BY Joseph N. Schofield
ATTORNEY

July 16, 1940.  F. O. HOAGLAND  2,207,804
DRILL GRINDER
Filed Oct. 28, 1938  2 Sheets-Sheet 2
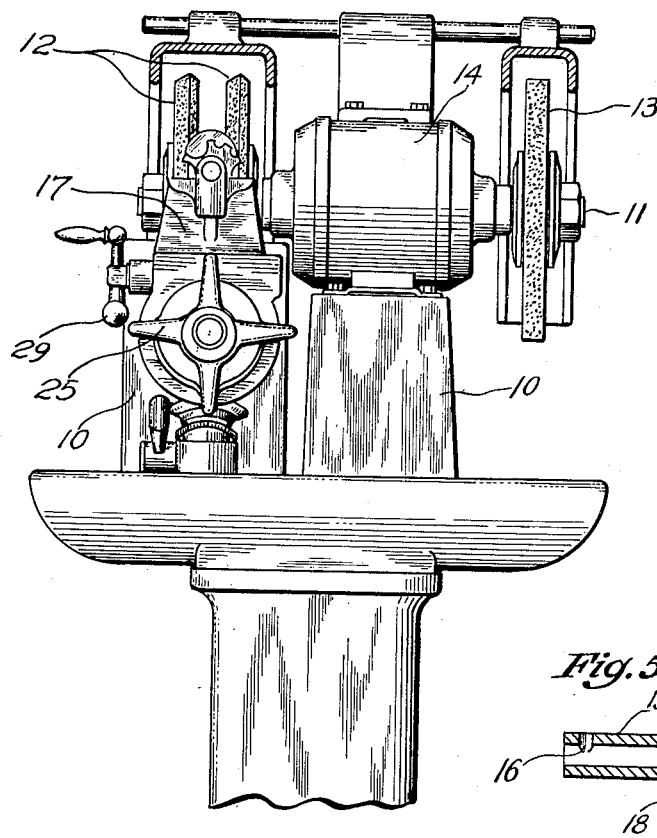
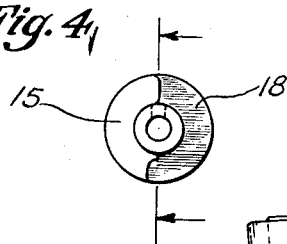
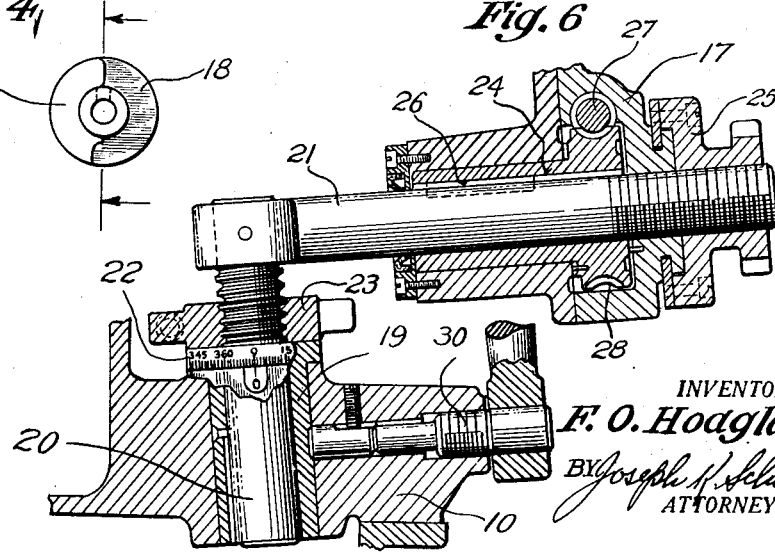
INVENTOR.
F. O. Hoagland
BY Joseph H. Schofield
ATTORNEY Patented July 16, 1940

2,207,804

UNITED STATES PATENT OFFICE 2,207,804

DRILL GRINDER

Frank O. Hoagland, West Hartford, Conn., assignor to Niles-Bement-Pond Company, Hartford, Conn., a corporation of New Jersey Application October 28, 1938, Serial No. 237,511

4 Claims. (Cl. 51—219)

This invention relates to grinding machines and particularly to a machine for grinding the cutting surfaces of a single lip metal cutting deep hole drill.

An object of the present invention is to provide a simple and conveniently operated grinding machine enabling a drill of relatively small diameter for cutting deep holes to be properly sharpened upon correct oblique angles and with the necessary axial relief.

One feature which enables the above object to be accomplished is that the drill having its cutting surfaces formed or resharpened is mounted for rotation about its axis and for simultaneous axial movement toward an abrasive wheel, there being a suitable holder for the drill provided with a cam limiting this axial and rotary movement and there being a suitable support for the drill holder which may be angularly adjusted relative to the grinding surface of the abrasive wheel.

Another feature of importance is that the axially movable tool holder is supported on a vertically adjusted member and is angularly adjustable about two axes at right angles to each other, thus enabling the tool holder to be disposed at any desired oblique angle relative to the abrasive surface.

With the above and other objects in view, the invention may include features of construction and operation set forth in the following specification and illustrated in the accompanying drawings.

In the accompanying drawings annexed hereto and forming a part of this specification, I have shown the invention embodied in a manually operated drill sharpening machine for deep hole drills of the single lip type, but it will be understood that the invention can be otherwise embodied and that the drawings are not to be construed as defining or limiting the scope of the invention, the claims appended to this specification being relied upon for that purpose.

In the drawings:

Fig. 3 is a front elevation of the machine shown in Fig. 1.

Figs. 4 and 5 are respectively an end view and a longitudinal sectional view of the cam on the drill holder.

Fig. 6 is a sectional view of the supports for mounting the drill being sharpened.

Figure 1:
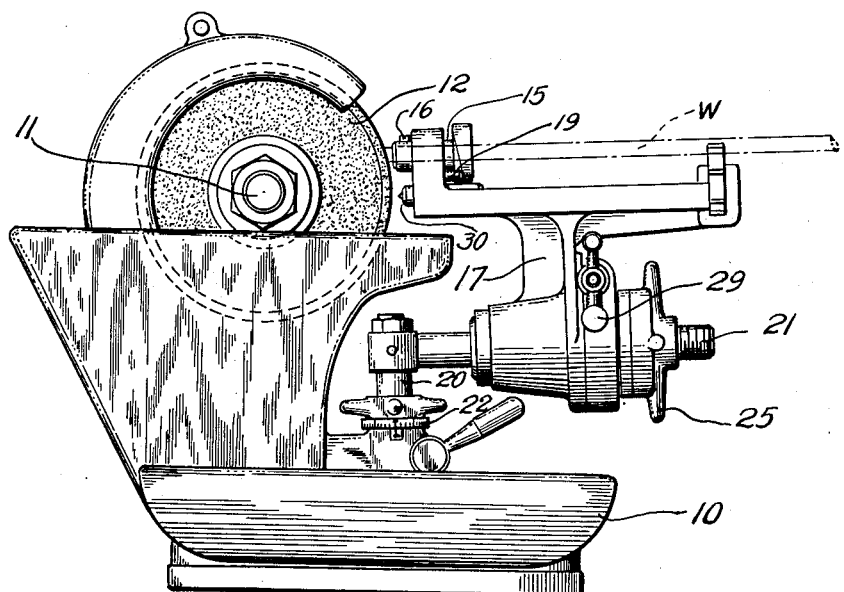
Figure 1 is a complete side elevation of the working parts of the drill sharpening machine disclosed and claimed in this application.
Figure 7:
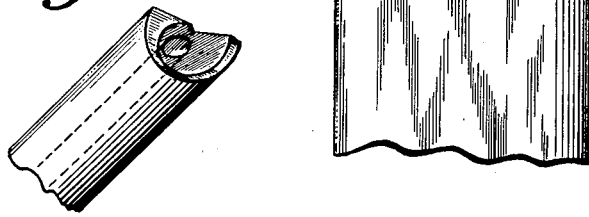
Fig. 7 is a perspective view of a drill showing the surfaces ground by the present invention.
Figure 2:
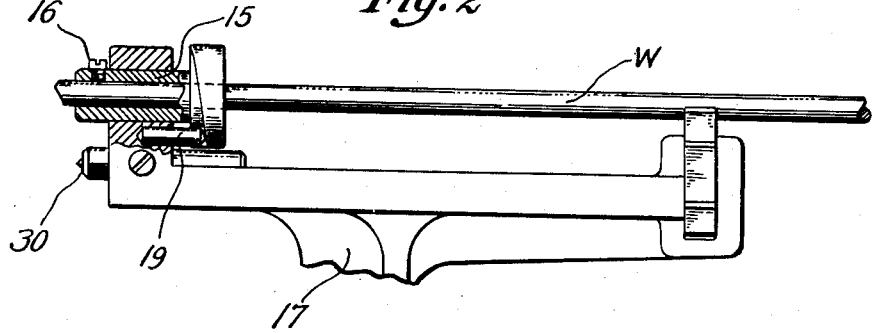
Fig. 2 is an enlarged view of the axially movable drill holder and a part of the support used in connection with this machine.

In the above mentioned drawings there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a rotatably mounted abrasive wheel, the periphery of which is beveled at oblique angles on opposite sides; second, a vertically adjustable work supporting arm angularly adjustable substantially in a horizontal plane about an axis at right angles to the axis of rotation of the abrasive wheel; third, a work support on this angularly adjustable arm, the support being angularly adjustable about the axis of the supporting arm; fourth, an axially movable drill holder in the support, the direction of movement being in all adjustments of the support and arm directly toward the abrasive surface of the wheel; and fifth, cam means to axially advance the drill during its rotation and while in engagement with the surface of the abrasive wheel.

Referring more in detail to the figures of the drawings, I provide a base or head 10 in which may be rotatably mounted, preferably upon a horizontal axis, a spindle 11 carrying one or more grinding wheels 12 and 13. In the embodiment selected for illustration the spindle 11 is shown rotated by a directly connected motor 14, there being two similar wheels 12 on one end of the motor shaft and a single wheel 13 mounted upon the opposite end. The two wheels 12 are or may be entirely similar, two being provided so that one may be used for roughing and its companion wheel may be used for final finishing of any drill sharpening operation. The single wheel 13 upon the opposite end of the shaft 11 is not essential for the sharpening operation but is placed there for general utility and for miscellaneous operations.

The peripheries of the two adjacent wheels 12 are similarly beveled, these angles being approximately 30° on one side and 45° on the opposite side. The longer beveled side at 30° to the axis of the wheel is used for grinding the oblique front surface of the drill being sharpened and the opposite or shorter beveled surface is used for forming the relieved annular cutting surface at the point of the drill.

The drill W having its end ground or sharpened to proper form for metal cutting is mounted for axial movement within a drill holder 15, there being a clamping screw enabling the drill W to be secured to the holder 15 for rotation therewith. A pin 16 extending within the holder 15 enters the hole within the holder for the drill W and engages against the side face of the straight flute of the drill and positions the drill in proper rotative relation to the holder. This holder 15 is slidably mounted within a bracket member or support 17, the position and operations of which will presently be more fully described. On the drill holder 15 is a cam surface 18 preferably forming a portion of the face of a head formed integrally on the work holder. The cam surface 18 engages a pin or other projection 19 outstanding from the forward end of the supporting bracket 17. This cam surface 18 is such that as the drill holder 15 and drill W are rotated they will be advanced axially in a direction toward and from the surface of one of the abrasive wheels 12. The surface on the cam 18 is helical so that the proper forward movement during rotation of the drill is provided to form the desired axial relief upon the front cutting surface of the drill. The oblique front face of the drill W is formed by forcing the drill against the beveled periphery of one of the wheels without rotating the drill.

To adjust the supporting bracket 17 relative to one of the abrasive wheels 12 there is provided a substantially vertical stud 20 mounted in a portion of the head 10 carrying an arm 21 extending radially therefrom. This arm 21 may be adjusted vertically by means of screw threads formed on the stud 20 and may be also adjusted to any angular position about its vertical axis, the obliquity being indicated by means of graduations 22 provided on the sleeve 19. Means in the form of a collar 23 engaging the threads on the stud 20 are provided so that the radial arm 21 may be raised or lowered conveniently to any position. A clamping screw 30 within head 10 and engaging the sleeve 19 enables the arm 21 to be clamped in any oblique position.

To mount the bracket 17 upon the radial arm 21 there is provided a member 24 adjustable therealong by means of a nut 25 engaging screw threads formed on the arm. By means of the nut 25 and the screw threads therefor the member 24 is adapted to be held in any adjusted position along the arm 21. Within this member a spline 26 engages a longitudinal groove in maintaining the member against rotation. Over this member 24 fits the drill supporting bracket 17, there being a worm 27 and worm wheel 28 connection between the member 24 and bracket 17 so that by rotation of the worm 27 through its handle 29 the drill supporting bracket 17 may be angularly adjustable about the horizontal axis of the radial arm 21.

In operation the drill W is first mounted within its holder 15 with the pin 16 in engagement with the flute of the drill. The arm 21 is then raised and clamped in proper angular position to engage the front face of the drill W upon one of the beveled sides of one of the wheels 12. The bracket 17 also is angularly adjusted about the axis of arm 21 for this purpose. The end face of the drill will therefore be formed upon an oblique angle corresponding to the oblique adjustment of the arm 21. The bracket 17 is then adjusted angularly by the worm 27 and worm wheel 28 to position the drill W against the oppositely beveled side of a wheel 12. In this position of the bracket 17 the drill W retained within its holder 15 is advanced against a side of one of the wheels 12 by rotating the holder 15. The cam surface 18 permits axial movement of the drill during this rotation to form the relieved surface of the drill. This operation takes place with the arm 21 in the same oblique or angular adjustment used for the plane oblique end face of the drill.

To restore the surfaces of the wheels 12 a diamond dressing tool 30 may be mounted in the forward portion of the bracket and passed over the wheel by angularly moving the bracket 17. Preferably one of the wheels 12 may be for rough grinding the drill surfaces and the other wheel adapted to finish grind these surfaces. Rough grinding of the oblique flat surface of the drill and the axially relieved surface are completed after which the bracket 17 is tilted by rotation of the worm 27 to enable these surfaces to be finish ground on the other wheel.

What I claim is:

1. A drill sharpening machine comprising in combination, a rotatable abrasive wheel having a beveled surface on its periphery, a support adjustable angularly about two axes at right angles to each other, means to adjust said support axially in the directions respectively of said axes, a drill holder rotatably mounted within said support, and a cam on said holder adapted when rotated with said holder to axially advance said holder in a direction toward the abrasive surface of said wheel.

2. A drill sharpening machine comprising in combination, a rotatable abrasive wheel having a beveled surface on its periphery, a support adjustable angularly about two axes at right angles to each other, means to adjust said support axially in the directions respectively of said axes, a drill holder rotatably mounted in said support, means contacting the front cutting surface of a drill to secure said drill therein in predetermined rotative position, and a cam on said holder adapted when rotated with said holder to axially advance said holder and drill in a direction toward the abrasive surface of said wheel.

3. A drill sharpening machine comprising in combination, a rotatable abrasive wheel, a support adjustable angularly about two axes at right angles to each other, means to adjust said support axially in the directions of said axes, a drill holder rotatably mounted within said support, means to retain a drill in predetermined rotative position therein, and a cam on said holder adapted when rotated with said holder to axially advance said holder in a direction toward the abrasive surface of said wheel.

4. A drill sharpening machine comprising in combination, a rotatable abrasive wheel, a support adjustable angularly about two axes at right angles to each other, means to adjust said support axially in the directions of said axes, a drill holder rotatably mounted in said support, means contacting the front cutting surface of a drill to secure said drill therein in predetermined rotative position, and a cam on said holder adapted when rotated with said holder to axially advance said holder and drill in a direction toward the abrasive surface of said wheel.

FRANK O. HOAGLAND.